2 Sheets—Sheet 1.

J. SPEAR.

BASE-BURNING FIRE-PLACE HEATER.

No. 7,379. Reissued Oct. 31, 1876.

*Attest:*

L. H. Seely
R. T. Dyer

*Inventor:*

James Spear

THE GRAPHIC CO. N.Y.

2 Sheets—Sheet 2.

J. SPEAR.

BASE-BURNING FIRE-PLACE HEATER.

No. 7,379. Reissued Oct. 31, 1876.

Attest:
L. H. Seely
R. T. Dyer

Inventor:
James Spear

THE GRAPHIC CO. N.Y.

UNITED STATES PATENT OFFICE.

JAMES SPEAR, OF PHILADELPHIA, PENNSYLVANIA.

IMPROVEMENT IN BASE-BURNING FIRE-PLACE HEATERS.

Specification forming part of Letters Patent No. 122,863, dated January 16, 1872; reissue No. 7,379, dated October 31, 1876; application filed October 21, 1876.

*To all whom it may concern:*

Be it known that I, JAMES SPEAR, of 1016 Market street, (formerly of 1116 Market street,) Philadelphia, Pennsylvania, have invented a new and useful Improvement in Fire-Place Heaters and Stoves, which improvement is fully set forth in the following specification, reference being had to the accompanying drawings.

My invention consists in the construction of the front movable circle or border in two parts, so as to facilitate the fixing of the heater within the fire-place; also, in the arrangement of a movable damper in the top of the heater-casing; also, in the regulating-damper applied to the doors opening into the dust-chamber; also, in the arrangement of a lower row of mica windows; also, in the construction of the grate with an anti-clinker opening between it and the fire-pot, mica lights opposite the opening, and a descending and an ascending smoke-flue.

Figure 1:
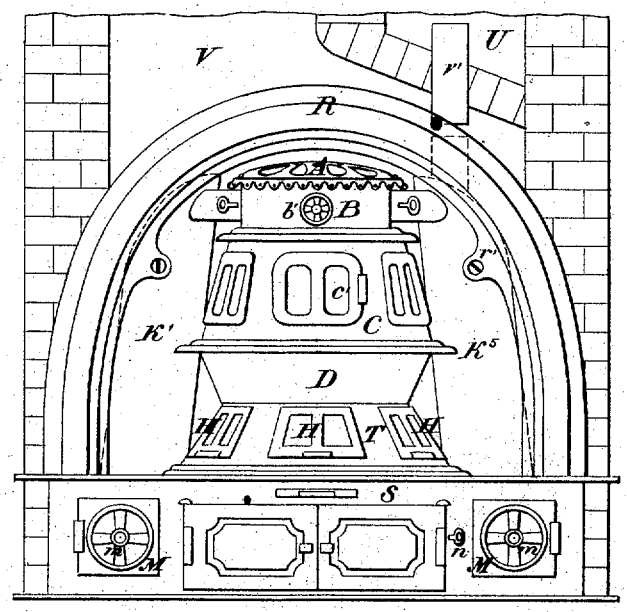
Figure 6:
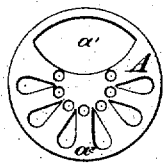
Figure 8:
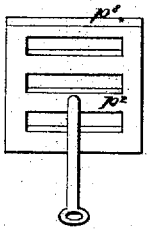
Figure 2:
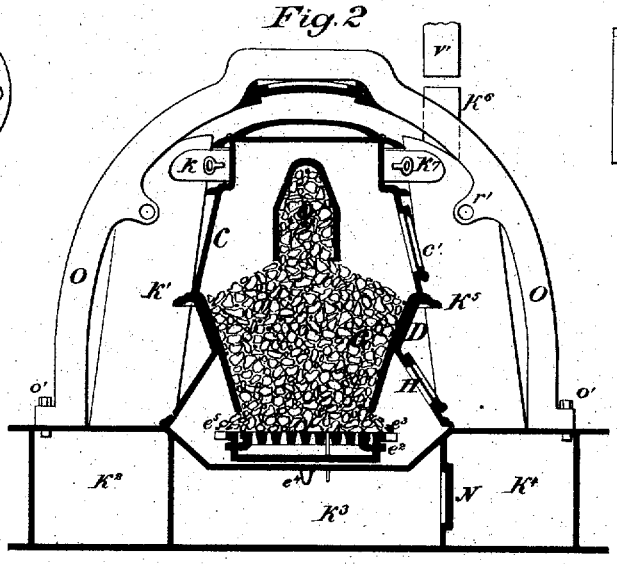
Figure 3:
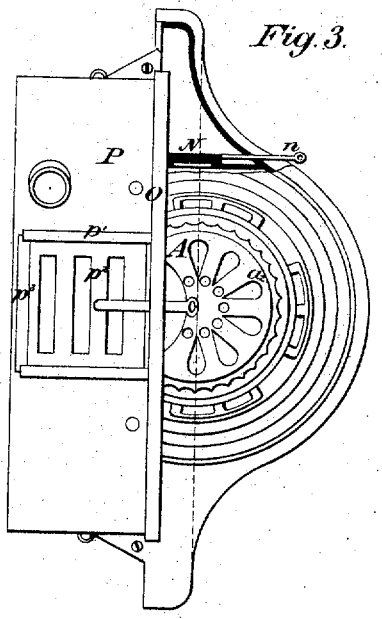
Figure 8:
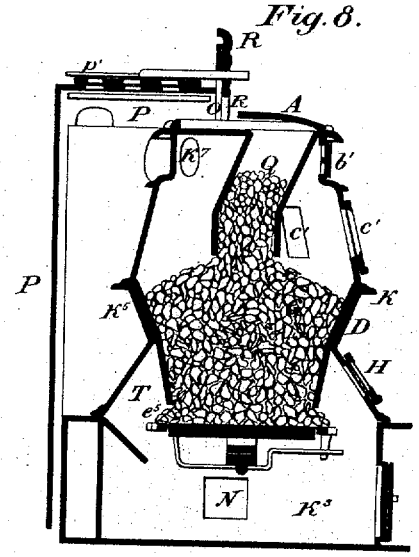
Figure 5:
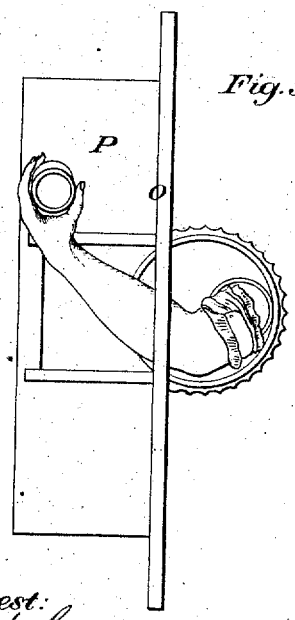
Figure 4:
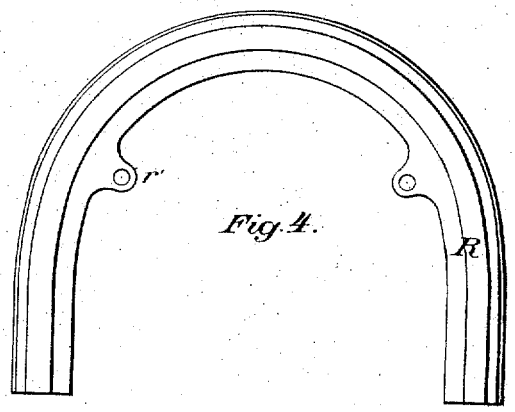

Referring to the drawings making part of this specification, Figure 1 is a front view of the fire-place heater, showing the chimney-flues behind in section. Fig. 2 is a section through the heater on line *x y*, also showing the top damper beyond in section. Fig. 3 is a plan of the fire-place heater, partly in section, with the outer frame removed. Fig. 4 is a view of the outer frame by itself. Fig. 5 is a plan of the stove, showing the operation of connecting the stove-pipe joints. Fig. 6 is a plan of the top ornamental plate. Fig. 7 is a plan of the top damper. Fig. 8 is a vertical section through the heater, from front to rear, on the center line.

In Fig. 1, A is the top ornamental plate. It revolves on the top of the stove, so that the opening $a^1$ (shown in Fig. 6) can be brought to the front when filling the reservoir, and then revolved to the back of the stove, leaving the ornamental portion $a^2$ in front. B is the sheet-iron casing surrounding the reservoir; $b'$, a register for admitting cold air. The lower part of the body of the stove C is of cast-iron, inclining inward toward the top, and fitted with hinged mica windows $c'$. The section of the body D below contains the fire-pot G, below the mouth of which is suspended the grate. (See Fig. 2.) This grate consists of a central circular part, $e^1$, pivoted at $e^2$ to a surrounding ring, $e^3$, which extends beyond the mouth of the fire-pot G to prevent the fire falling out, and at a sufficient distance therefrom to permit of the removal of slate and clinkers through the opening $e^5$. This ring $e^3$ turns on a center pivot $e^4$, thus permitting of the grate being rocked or dumped at will. Above the base S is a draft-section of the stove T in the form of a frustum of a cone, inclining inward at an acute angle, meeting the inverted section D, which contains the fire-pot. The section D sometimes has a fire-brick lining. This draft-section T contains a row of mica windows, H, opposite the clinker-cleaning opening $e^5$, which gives at all times an uninterrupted view of the state of the fire upon the grate $e^1$, and an additional illumination therefrom. The grate is fully described in my patent of March 1, 1870.

The smoke and gas from the fire pass into the pipe K, down radiating-flue $K^1$ into the base-flue $K^2$, around the base at the back of the ash-pit $K^3$, and up the radiator $K^5$, and out of the pipe $K^6$ to the chimney. It will be be seen that the smoke and hot gases of the fire traverse the base of the stove, making what are known as descending and ascending flues. By turning the direct-draft damper in the short pipe $K^7$ gas and smoke pass at once into $K^5$, and up the chimney, without making the circuit of the radiator $K^1$ and base-flue $K^2$.

At the front of the base-flue $K^2$ $K^4$ are hinged doors M, made with registers *m*. These are for regulating the draft, which can be done better in this way than by opening the door M, which is liable to close with the draft or swing wide open. These registers *m* can be set with the exactness required, according to the draft of the chimney.

In Fig. 3 is shown the dust-damper N. It is opened by the handle *n* in front, so as to uncover the opening communicating between the ash-pit $K^3$ and flue $K^4$ leading to the chimney whenever the grate is shaken or the ash-drawer removed.

To the base of the stove is bolted the cast-iron inner frame or arch O by bolts $o'$, (see Figs. 2,) and to it is riveted the sheet-iron casing P. Two cast-iron grooves, $p^1$, are riveted to the top of the casing, in which slides the upper damper-plate $p^2$ upon the lower grated plate $p^3$. Both these plates are removable, as shown in Fig. 7. The opening to the reservoir Q is to the front and at the top, immediately beneath the ornamental arch, as shown in dotted lines, Fig. 3. It inclines backward toward the center of the stove as it descends toward the fire-pot. To the rear of the stove is seen, in Fig. 1, a section through the chimney, showing the smoke-flue $u$, also the hot-air flue $v$, which conveys the heated air passing through the damper $p^2$ up into the room above. When the heater is put in its place the short stove-pipe $v'$ connects the smoke-pipe $K^6$ with the flue $u$.

I will now describe the mode of fixing the heater in the fire-place. The front arch R, if it has not been packed separate, is first removed by unscrewing the bolts from the lugs $r'$. The ornamental plate A is taken off, the damper shown in Fig. 7 removed. The heater is then set in its place under the mantel, and the workman introduces his arm, as shown in Fig. 5, and, grasping the pipe $v'$, connects it to the smoke-pipe $K^6$. The damper, ornamental plate, and front arch are then replaced. By this movable damper I avoid cutting a hole through the sheet-iron casing for the purpose of inserting the arm to connect the pipe. When these arm-holes are cut through the casing they are difficult to close again, and the heat escapes through them. By the use of my damper, entirely removable from the casing P, I overcome this difficulty, and thereby avoid the necessity of fixing a damper in the hot-air flue leading to the room above.

This construction of stove not only affords convenient access to the pipe $v'$, but brings it into view of the workman during the operation. Another advantage gained is that when the galvanized casing is riveted to the inner arch $o$, and this arch secured by the bolts to the base, the sheet-iron casing has all the necessary strength to retain the damper in its position, and also for shipment, independent of the outside ornamental frame R, the stove can be shipped safely, and the outer ornamental arch R, which is finely finished, can be wrapped in paper and packed separately.

What I claim as my invention, and desire to secure by Letters Patent, is—

1. The outer removable frame R, the inner fixed frame O, and casing P, arranged in combination in a fire-place heater, as herein described.

2. The combination of the casing P with a removable damper, $p^2$, and plate $p^3$, for the purpose herein described.

3. The combination of the lower row of mica windows H, inclining inward, as shown, with the openings $e^5$ and the grate extending beyond the mouth of the fire-pot, as herein described.

4. The ornamental plate A, turning in a groove on the top of the stove, so as to bring the open part $a^1$ to the front while filling the reservoir, and the ornamental part $a^2$ at other times, as herein described.

5. The combination, in a fire-place heater or stove, of a descending and an ascending smoke-flue, illuminating windows or doors in the draft-section T, and the free open space $e^5$ between the top surface of the grate or fire-bed and the base of the fire-pot or combustion-chamber proper.

JAMES SPEAR.

Witnesses:
EDWD. BROWN,
JOHN F. GRANT.